United States Patent [19]

Shimano

[11] 4,322,209
[45] Mar. 30, 1982

[54] DERAILLEUR WITH IMPROVED MECHANISM FOR MOVING AND RETAINING A MOVABLE MEMBER TO AND IN A DESIRED SPEED CHANGE STAGE

[75] Inventor: Keizo Shimano, Sakai, Japan

[73] Assignee: Shimano Industrial Company, Limited, Osaka, Japan

[21] Appl. No.: 148,805

[22] Filed: May 12, 1980

[30] Foreign Application Priority Data

May 24, 1979 [JP] Japan .................................. 54-65345
May 24, 1979 [JP] Japan .................................. 54-65346

[51] Int. Cl.³ .......................... F16H 7/22; F16H 9/06; F16H 11/08
[52] U.S. Cl. ...................................... 474/82; 74/540; 280/236
[58] Field of Search .......................... 474/82; 280/236; 74/540

[56] References Cited

U.S. PATENT DOCUMENTS 3,974,707 8/1976 Nagano .................................. 474/82
4,030,375 6/1977 Nagano .................................. 474/82
4,106,356 8/1978 Nagano et al. ........................ 474/82
4,132,119 1/1979 Nagano et a. ......................... 474/82
4,193,309 3/1980 Nagano .................................. 474/82
4,198,873 4/1980 Nagano et al. ........................ 474/82
4,229,987 10/1980 Fujimoto ............................... 474/82

FOREIGN PATENT DOCUMENTS 13647 1/1980 European Pat. Off. .............. 474/82
2907741 8/1979 Fed. Rep. of Germany ........ 474/82

Primary Examiner—C. J. Husar
Assistant Examiner—Conrad Berman
Attorney, Agent, or Firm—Stevens, Davis, Miller & Mosher

[57] ABSTRACT

A four link member derailleur for a bicycle, which comprises a fixing member, two linkage members, and a movable member having a chain guide, and a return spring is provided with a control element having a plurality of engageable portions corresponding to the number of speed change stages and with a retainer engageable with each engageable portion at the control element to retain the movable member in a desired speed stage. The control element and retainer cooperate during shifting such that if a stroke of a control cable supported to the retainer is less than a given length, the retainer retains its engagement with each engageable portion, while if the stroke is greater than the given length, the retainer disengages from the engageable portion. A tension spring for stretching the cable and biasing the retainer in the direction of its disengagement from the engageable portions and an energy conservation spring for conserving energy when the cable is pulled to swing the retainer, are used to operate the movable member in rapid traverse-after the retainer disengages from the engageable portions.

16 Claims, 20 Drawing Figures

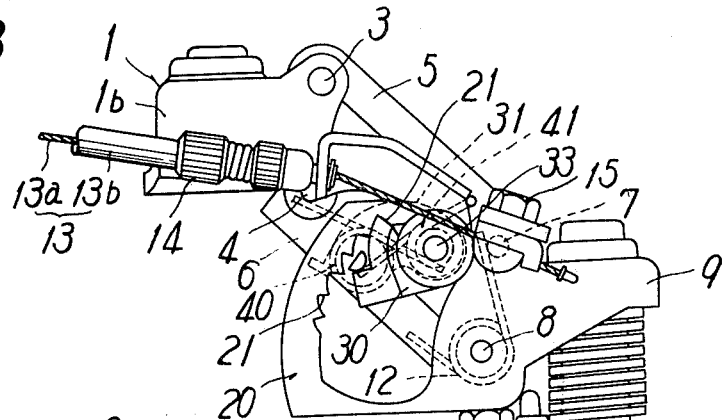
FIG. 8
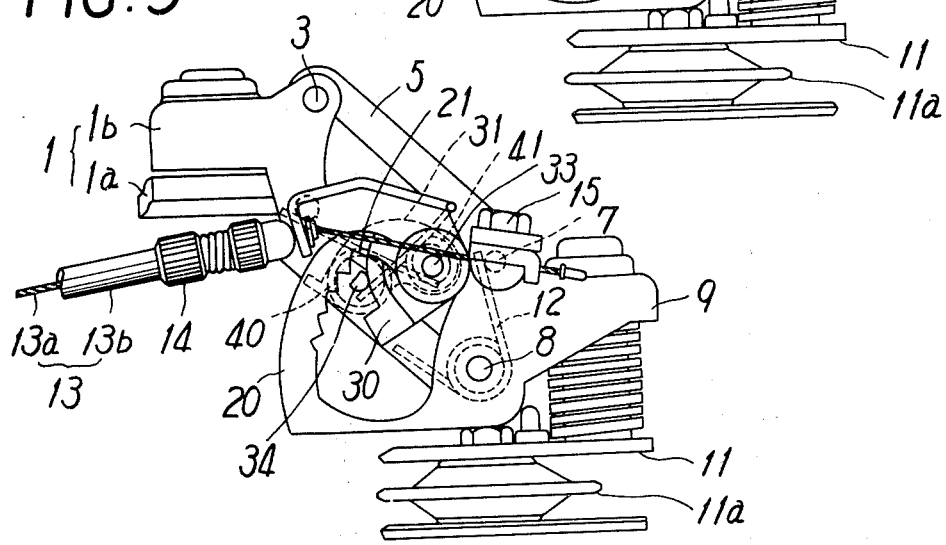
FIG. 9
FIG. 10
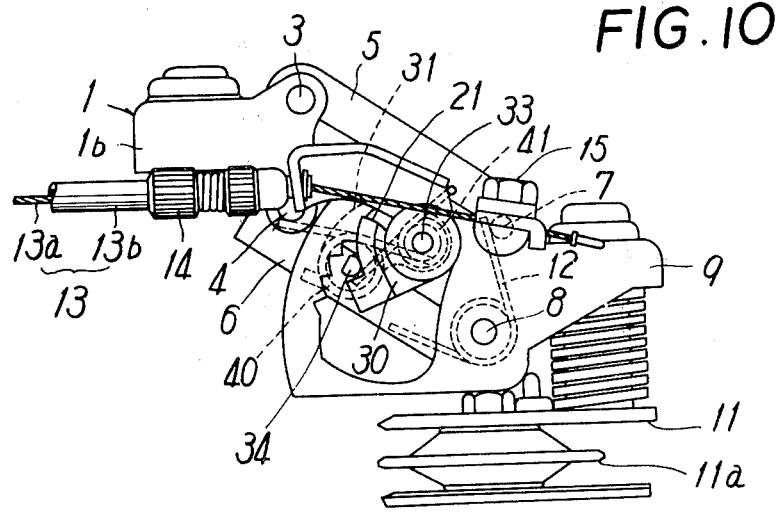

4,322,209

DERAILLEUR WITH IMPROVED MECHANISM FOR MOVING AND RETAINING A MOVABLE MEMBER TO AND IN A DESIRED SPEED CHANGE STAGE

FIELD OF THE INVENTION

This invention relates to a derailleur for a bicycle, and more particularly to a derailleur for a bicycle, which comprises four members, namely, a fixing member, two linkage members, and a movable member having a chain guide, and has a return spring supported between two of the four members, so that operation of a control cable and action of the return spring cooperate to impart reciprocal movement to the movable member with respect to the fixing member, whereby a driving chain guided by a chain guide is switched to one of at least two or more sprockets for changing the bicycle speed. The control cable may be of the type having no outer sheath or of the type comprising a inner wire and an outer sheath guiding the wire.

BACKGROUND OF THE INVENTION

A modification of this type of derailleur has been proposed in U.S. Pat. No. 3,974,707 in which the derailleur has a control member having a plurality of recesses corresponding to the number of speed change stages mounted on one of the four members and a ball engageable with each of the recesses carried by another member in relative motion to the one member, so that when both members relatively move, the ball travels with respect to the recesses and engages therewith to be positioned and retained in accordance with a desired speed change stage.

This construction makes it impossible to return a chain guide by action of a return spring, because the ball engages elastically with each of the recesses to retain the chain guide in position, which results in the need for use of two cables or the so-called push-pull type cable in order to forcibly reciprocate the chain guide.

When no return spring is used, the ball must be subjected to a sufficient force for disengaging it from each of the recesses, whereby a control lever is lightly operable. Unfortunately, the control wire cannot be formed by the usual pull type wire making it expensive to produce.

Another modification of this type of derailleur has been proposed in U.S. Pat. No. 4,030,375 in which the derailleur has a chain guide which is moved in one direction by pulling the pull-type wire and returned in the opposite direction by action of the return spring, and has at one of the four derailleur members, a cam having a plurality of notches corresponding to the number of speed change stages and at another member in relative motion to the one member, a roller or pin engageable with the notches, so that the roller or pin engages with a selected one notch, thereby accurately positioning the chain guide in accordance with a desired speed change stage.

With this construction it is possible to position the chain guide in accordance with a desired speed change stage even when the control cable changes in length. However, one problem with this arrangement is that it is structually impossible to maintain the chain guide in position through the notches, thereby requiring the application of frictional resistance to a control lever for overcoming the strength of the return spring, which results in the need for a large force to operate a control lever. Another problem is that this type of derailleur produces noise when a driving chain is switched to a selected sprocket. In explanation of this problem, the roller or pin moves along the cam face with respect to the notches following the relative motion between two of the four derailleur members by a pull of the control wire or action of the return spring. The path of movement of the roller or pin across adjacent notches describes a circular arc around the border therebetween. As a result, the chain guide, when the chain is switched to a selected sprocket by a pull of the wire, moves following the operation of the control wire without intermittence. Accordingly, when the wire is operated to reciprocate the chain guide, the chain slowly contacts with a sprocket to which the chain is to be switched thereby generating noise and increasing wear of the chain and sprocket.

To solve the aforesaid problems, a derailleur has been proposed which is provided with means through which a retainer engaging with one of the notches is forcibly moved to disengage therefrom, so that the return spring acts to quickly move the movable member. This, however, is effective only for quickly moving the movable member by action of the return spring. Hence, when a driver slowly operates the lever to pull the control cable, noise is still generated and wear of the chain and sprocket still occurs.

SUMMARY OF THE INVENTION

This invention has been designed to completely solve the aforesaid problems. An object of the invention is to provide a derailleur which can accurately position a movable member and maintain it in position in accordance with a desired speed change stage even with a usual pull-type wire, eliminate noise during reciprocal movement of the chain guide regardless of a slow operation of the control wire by a driver, and reduce wear of the chain and sprocket.

The derailleur of the invention is provided with a control element mounted on one of the derailleur members and having a plurality of engageable portions corresponding to the number of speed change stages, and with a retainer mounted on another member in relative motion to the one member and engaging with one of the engageable portions at the control element to stop reciprocation of the chain guide. The retainer carries therewith the control cable, and, when the chain guide is reciprocated by operation of the control cable with a stroke less than a given extent, is retained in engagement with one of the engageable portions to thereby restrain reciprocation of the chain guide. On the other hand, when the stroke is greater than the given extent, the retainer disengages from the engageable portions. Furthermore, the derailleur has a tension spring for continuously biasing the control cable to a stretched condition and the retainer in the direction of disengaging from the engageable portions, and has a spring for conserving energy when the control cable is operated against the return spring to swing the retainer, so that the energy conservation spring and tension spring may reciprocate the movable member in rapid traverse.

In addition, the present invention includes the mounting of the control element and retainer not only directly to two relatively movable members of the four derailleur members: a fixing member, two linkage members and a movable member, but also to pins connecting these members and indirectly to the two members through a third member fixed or pivoted thereto. The present invention also is applicable to a front derailleur as well as a rear derailleur. The control cable in the invention includes a wire without an outer sheath as well as a cable comprising an inner wire and outer sheath, where one of the inner wire and outer sheath is supported to the retainer and the other to one of the four derailleur members.

The derailleur of the invention enables the movable member to reciprocate in rapid traverse by a pull of a control cable and action of the return spring regardless of slow operation of the cable through the control lever, whereby noise generated from the chain which is guided by the chain guide and contacts with the sprocket, is minimized and also wear of the chain and sprocket is extremely reduced.

BRIEF DESCRIPTION OF THE DRAWINGS

FIGS. 11 through 20 show modified embodiments of the invention, in which FIGS. 11 and 16 are bottom plan views thereof, FIGS. 12 and 17 are partially omitted rear views of the same, FIGS. 13 through 15, 19 and 20, are bottom plan views showing operating conditions of the derailleur of the modified embodiments, and FIG. 18 is a partially omitted rear view showing one of the modified embodiments in operating condition.

DETAILED DESCRIPTION OF THE INVENTION

Figure 1:
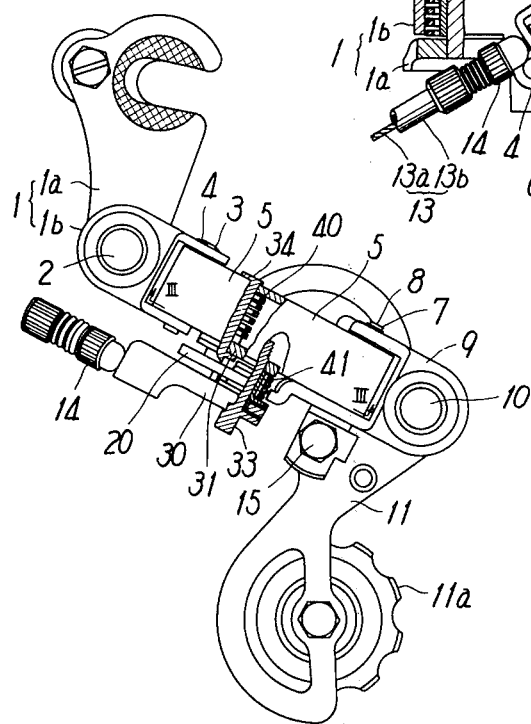
FIG. 1 is a front view of a typical embodiment of a derailleur of the invention.
Figure 2:
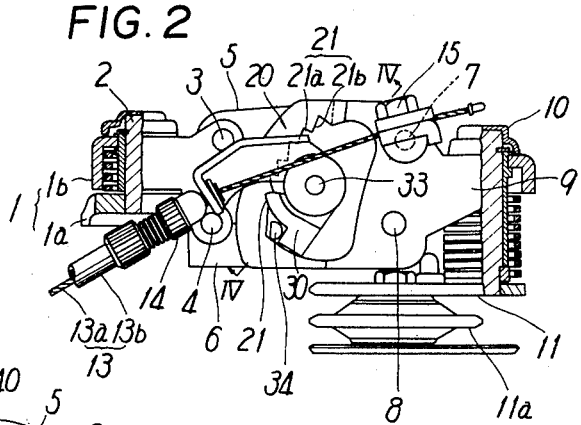
FIG. 2 is a bottom plan view thereof.
Figure 3:
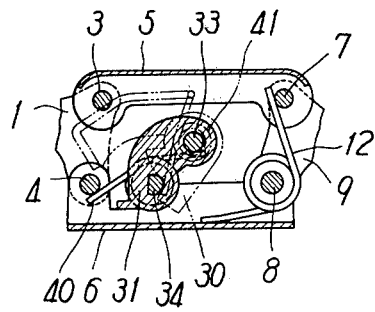
FIG. 3 is a sectional view taken on the line III—III in FIG. 1.

Rear derailleurs are shown in the drawings, which are each composed mainly of four members, namely, a fixing member 1, two parallel linkage members 5 and 6, and a movable member 9, and each have a return spring 12. The fixing member 1 comprises a bracket 1a fixed together with a hub shaft (not shown) to a fork end (not shown) of a bicycle and a support body 1b mounted on the bracket 1a rotatably in a given range through a pivot shaft 2 with respect to the bracket 1a, but not-movably in the direction of movement of the movable member 9.

The support body 1b is provided at one side thereof with opposite sidewalls carrying the two linkage members 5 and 6 pivoted thereto through two pins 3 and 4.

The linkage members 5 and 6 are each C-like shaped in section and have their open sides opposing one another.

The movable member 9 is similar in shape to the support body 1b, has at one side opposite sidewalls, and is supported thereat to the foremost ends of linkage members 5 and 6 pivotally through pins 7 and 8. At the other side of the movable member 9, a chain guide 11 having two guide pulleys 11a is mounted rotatably in a given range through a pivot shaft 10 parallel to the pivot shaft 2.

The guide pulleys 11a carry thereon a driving chain (not shown) and move axially of a multi-stage freewheel (not shown) to guide the chain to be switched to a selected one sprocket at the freewheel for changing the bicycle speed.

The aforesaid construction of the derailleur is well-known so as to be readily understood.

The present invention provides the derailleur constructed as just described at two relatively movable members of the four derailleur members with a control element 20 having a plurality of engageable portions 21 corresponding to the number of speed change stages, a retainer 30 engaging with one of the engageable portions 21 to stop reciprocation of the chain guide, an energy conservation spring 40, and a tension spring 41 for biasing a control wire 13 to a stretched condition, so that the chain guide 11, when changing speed, is positioned in accordance with a desired speed change stage and simultaneously retained in position, and then the retainer 30 disengages from the engageable portion 21 to thereby move the chain guide in rapid traverse.

The control element 20 and retainer 30 can be mounted on two relatively movable members of the derailleur as follows: (1) the control element 20 can be mounted on the fixing member 1 and the retainer 30 on the movable member 9 or either of the linkage members 5 and 6; (2) the control element 20 can be mounted on the movable member 9 and the retainer 30 on the fixing member 1, or either of the linkage members 5 and 6; and (3) the control element 20 can be mounted on one of the linkage members 5 and 6 and the retainer 30 on the fixing member 1, movable member 9, or the other of the linkage members 5 and 6. In other variants, the control element 20 and retainer 30 may be supported to the pins 3, 4, 7 and 8, connecting the above four derailleur members, or may be supported indirectly thereon through separate members (not shown) attached to the four members or pins. All such mounting arrangements are included in the present invention.

Next, an embodiment of the invention, in which the control element 20 is mounted on the movable member 9 and the retainer 30 on one linkage member 6, will be described in accordance with FIGS. 1 through 10.

A control element 20 in this embodiment comprises an extension extending toward the fixing member 1 integrally from one sidewall at the movable member 9. The extension is bored to form at its inner periphery six engageable portions 21 of ratchet-like teeth.

The engageable portions 21 have engaging faces 21a each for retaining the retainer 30 to hold the chain guide 11 in position, and connecting faces 21b for interconnecting the adjacent engaging faces respectively. The engaging faces 21a each are shaped in a semicircular arc around a pin 34 to be hereinafter described and each have a length corresponding to a stroke of a control lever (not shown) necessary to operate a control cable for one speed change stage.

Figure 4:
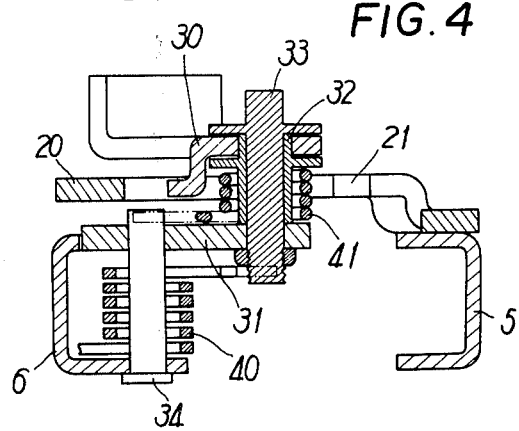
FIG. 4 is a sectional view taken on the line IV—IV in FIG. 2, FIGS. 5 through 10 are bottom plan views showing operating conditions of the derailleur.

The retainer 30, as shown in FIG. 4, is pawl-like shaped to engage with each engageable portion 21, and pivoted to a support arm 31 swingably through a guide tube 32 and pin 33, the arm 31 being pivoted to the linkage member 6 swingably through a pin 34. The retainer 30 is operated by the control cable 13 comprising an inner wire 13a and an outer sheath 13b as shown. One of the inner wire 13a and outer sheath 13b is supported to the retainer 30 and the other to the movable member 9, either of the linkage members 5 and 6, or either of the pins 7 and 8 supporting the movable member 9. In the drawings, the outer sheath 13b is supported to the retainer 30 through a support 14 and the inner wire 13 to the movable member 9 through a fixture 15.

The energy conservation spring 40 and tension spring 41 are interposed between the retainer 30 and the linkage member 6 carrying the retainer 30 through the support arm 31. The energy conservation spring 40 is coiled onto the pin 34 and retained at a first working end to the pin 33 and at a second working end to the pin 34. The tension spring 41 is coiled onto the guide tube 32 sleeved onto the pin 33 and retained at one end to the pin 34 and at the other end to a projection from the retainer 30.

The return spring 12 is interposed between the fixing member 1 and the movable member 9 or either of the linkage members 5 and 6, between the movable member 9 and either of the linkage members 5 and 6, or between the linkage members 5 and 6. In the drawings, the return spring 12 is interposed between the movable member 9 and the linkage member 6.

When the control cable 13 is operated with a stroke less than the prescribed extent to reciprocate the chain guide 11, the retainer 30 is kept in engagement with one of the engageable portions 21 thereby keeping the chain guide 11 stationary. When the cable 13 is operated with a stroke in excess of the prescribed extent, it disengages the retainer 30 from one of the engageable portions 21, and the return spring 12 or energy conservation spring 40 acts on the chain guide 11 to rapidly move the same in succession and in accordance with a desired speed change stage.

In greater detail, if a spring force of the return spring 12 is represented by $F_1$; that of the energy conservation spring 40, $F_2$; and that of the tension spring 41, $F_3$; these spring forces are defined to have therebetween a relation of $F_2 > F_1 > F_3$. Hence, when the control cable 13 is pulled to move the chain guide 11 against the return spring 12, the energy conservation spring 40 is deflected to conserve energy of the control force by the control cable 13, so that the conserved energy is used to operate the chain guide 11 in rapid traverse. On the other hand, when the control cable 13 is slackened to return the chain guide 11 by action of the return spring 12, the tension spring 41 acts on the retainer 30 to swing it in the direction of moving away from one engageable portion 21 engaging with the retainer 30. Then, the retainer 30 disengages from the one engageable portion 21, whereby the energy conserved in the return spring 12 returns the chain guide 11 in rapid traverse.

Next, the function of the derailleur constructed as described above will be described.

Figure 5:
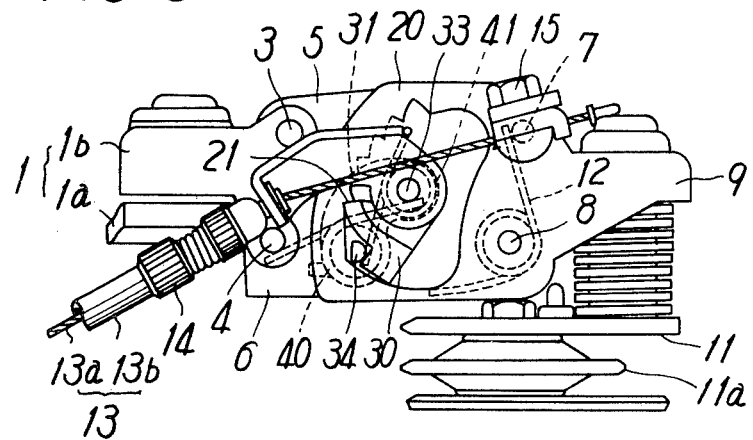
Figure 6:
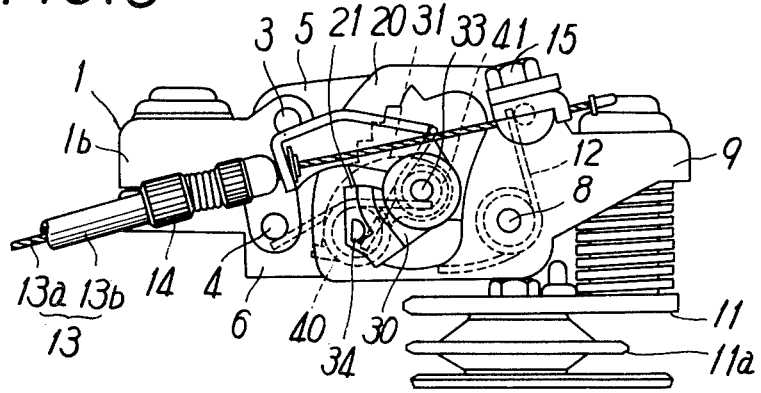
Figure 7:
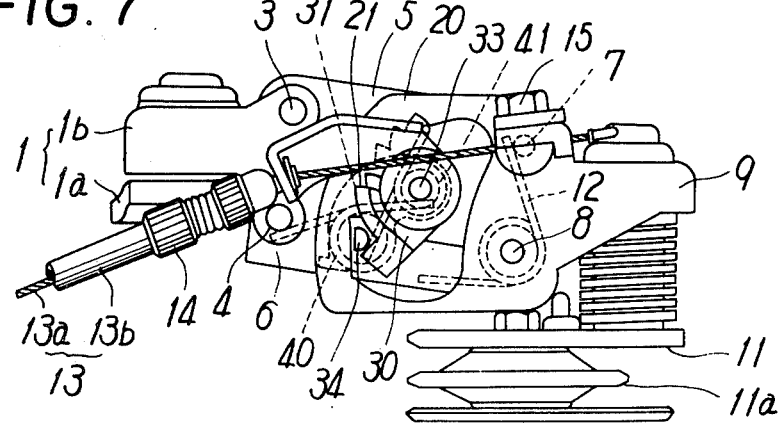

Referring to FIG. 5, the chain guide 11 is positioned in accordance with the highest speed stage. When the control lever is operated to pull the inner wire 13a for moving the chain guide 11 from the position in FIG. 5 toward the position in FIG. 7 corresponding to the low speed stage, the retainer 30 and support arm 31 are subjected to a biasing force caused by relative movement between the outer sheath 13b and the wire 13a, thereby reducing the length of a distance between the support 14 and the fixture 15. Hence, the retainer 30 at first swings clockwise around the pin 33, at which time the tension spring 41 is deflected. Then, the support arm 31 swings clockwise around the pin 34 through the swinging motion of retainer 30, whereby the energy conservation spring 40 is deflected to conserve therein the energy of control force by the wire 13a. At this time, when the wire is pulled with a stroke under the prescribed extent, the spring 40 merely deflects and the retainer 30 is retained in engagement with the one engageable portion 21 to keep the chain guide 11 stationary. When the stroke of wire 13a exceeds the prescribed extent and the support arm 31 swings in excess of a given angle, the retainer 30 supported to the support arm 31 disengages from the engageable portion 21, thus being in the condition shown in FIG. 6.

Upon disengagement of the retainer 30 from the engageable portions 21, the energy conserved in the energy conservation spring 40 immediately allows the chain guide 11 to move forward rapidly. Hence, the retainer 30 together with the support arm 31 swings counterclockwise around the pin 34 following the swinging motion, thereby engaging with the next engageable portion 21 to stop the forward movement of chain guide 11. As a result, the rapid traverse of chain guide 11 by the energy conserved in the spring 40 can considerably reduce noise generated by the chain contacting with the sprocket while being switched. In other words, the retainer 30 moves in the same direction as each engaging face 21a and along it, and after disengaging from the engaging face 21a, moves along each connecting face 21b. The movable member 9 is restrained from moving during movement of the retainer 30 along the engaging face 21a, and then allowed to move upon disengagement of the retainer 30 from the engaging face 21a, thereby enabling the chain guide 11 to reciprocate in rapid traverse. Accordingly, the chain guide 11, which rapidly reciprocates, can reduce noise generated by the chain while being switched to a desired sprocket. Also, since the retainer 30 engages with one of the engageable portions 21 to thereby position the chain guide 11 in accordance with a desired speed change stage, the chain guide 11, even when the operational stroke of the control cable slightly changes, can be stopped and retained always exactly in a proper position corresponding to the speed change stage.

The movement of the chain guide 11 from the position corresponding to the lowest speed stage in FIG. 8 to that corresponding to the high speed stage in FIG. 10 by action of the return spring 12 through a slackened wire 13a, will now be described.

In this case, the chain guide 11 moves rapidly by use only of the return spring 12 deflected by a pull of the wire 13a, but not by the energy conservation spring 40. Referring to FIG. 8, upon a slackening of the wire 13a, the tension spring 41, which always biases the retainer 30 to stretch the wire, allows the retainer 30 to swing counterclockwise and be disengaged from one of the engageable portions 21 as shown in FIG. 9. In this instance, when the wire 13a is slackened with a stroke less than a given extent, the movable member 9 is stationary due to the engagement of the retainer 30 with the engageable portion 21. Upon disengagement of the retainer 30 therefrom, the moveable member 9 is released and the energy conserved in the return spring 12 rapidly return the chain guide 11, at which time the retainer 30, which is biased counterclockwise by the tension spring 41, engages inevitably with the next engageable portion 21 and retained thereat due to rapid restoration of the chain guide 11 immediately after disengagement of the retainer 30. Hence, the rapid restoration of the chain guide 11 reduces noise generated by the chain contacting with a sprocket while being switched thereto. In other words, the noise is considerably reduced due to the fact that the retainer 30 moves along each engaging face 21a and in parallel thereto, the movable member 9 is kept from moving during the movement of retainer 30 along the engaging face 21a, and the disengagement of retainer 30 from the engageable portion 21 moves the movable member 9 by use of the energy conserved in the return spring 12, so that the chain guide 11 may rapidly return.

Next, modified embodiments of the invention will be described according to FIGS. 11 through 20.

The derailleurs shown in FIGS. 11 through 20 each have the control element 20 mounted on the fixing member 1 and the retainer 30 mounted on the movable member 9, the retainer 30 securing the inner wire 13a, and the fixing member 1 supporting the outer sheath 13b. These modified embodiments in FIGS. 11 through 20 are basically similar in construction to the embodiment shown in FIGS. 1 through 10, in which corresponding members are represented by the same reference numerals.

Figure 11:
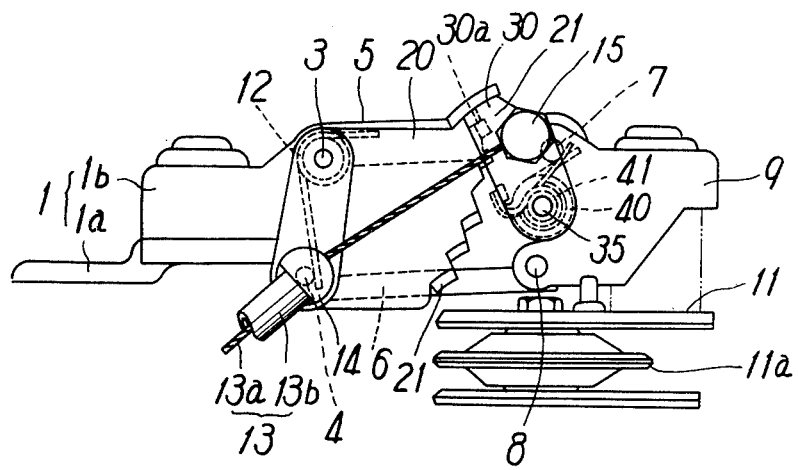
Figure 12:
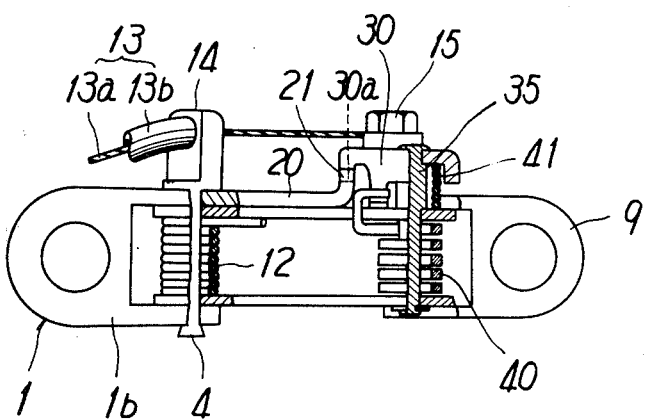
Figure 13:
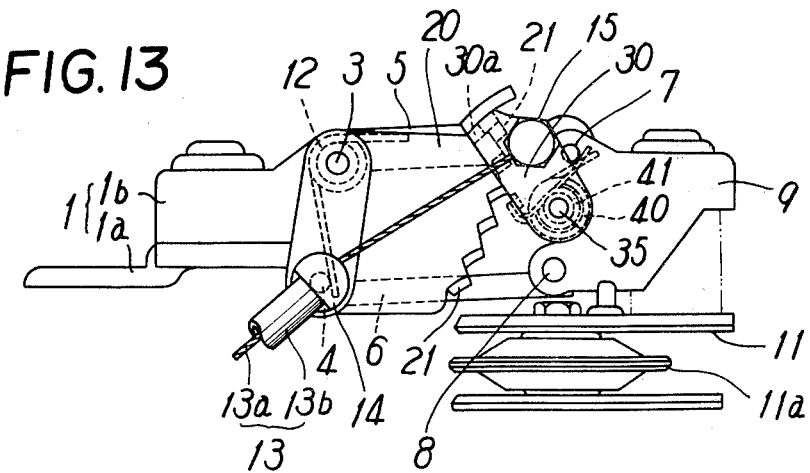
Figure 14:
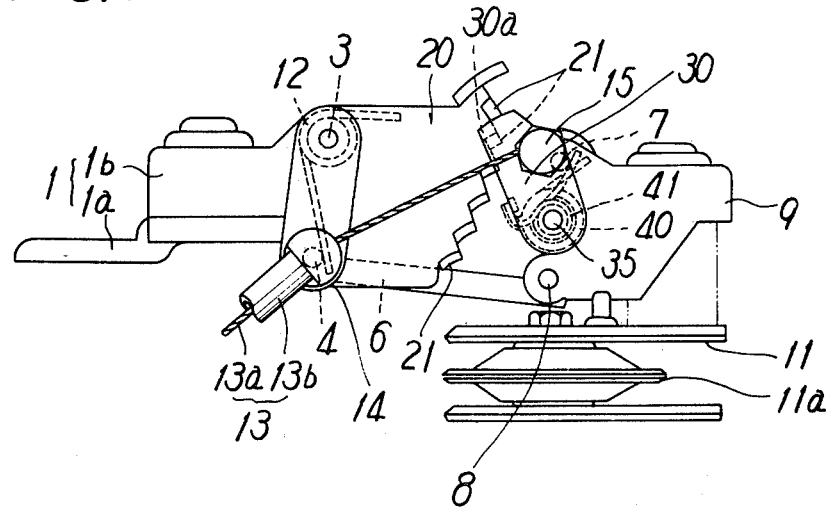
Figure 15:
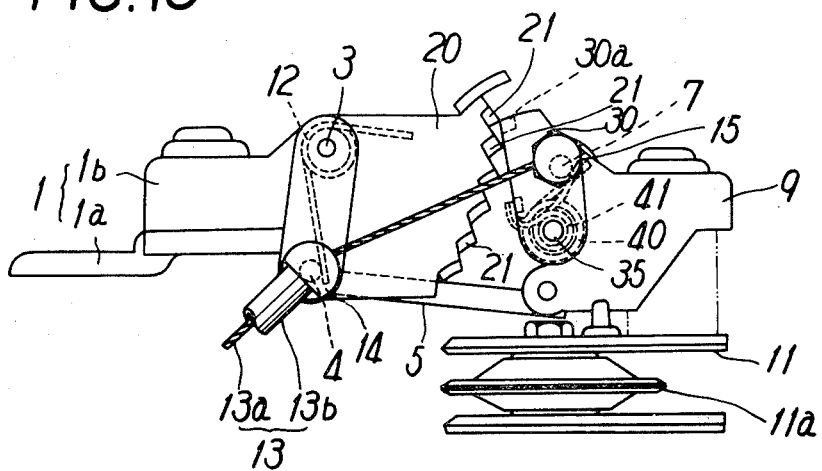

Referring to FIGS. 11 through 15, engageable portions 21 at the control element 20 project perpendicularly therefrom respectively, and a projection 30a engageable with each of the engageabe portions 21 is provided at the retainer 30. The retainer 30 is pivoted to the movable member 9 through a support pin 35. An energy conservation spring 40 and a tension spring 41 are wound onto the support pin 35, the energy conservation spring 40 being retained at its first working end to the retainer 30 and at a second working end to one axial end of the pin 7, so that the spring 40 is not deflected by the clockwise movement of retainer 30, in other words, in the working direction of tension spring 41. The tension spring 41 is retained at its one working end to the retainer 30 and at the other end to the pin 7, so that the energy conservation spring 40 does not act when the tension spring 41 acts. In FIG. 11, when the wire 13a is pulled, the retainer 30 swings counterclockwise to conserve in the energy conservation spring 40 the energy of controlling the wire 13a. Upon disengagement of the retainer 30 from the engageable portion 21 as shown in FIG. 13, the energy conserved in the spring 40 allows the chain guide 11 to move forward rapidly, and the retainer 30, as shown in FIG. 14, engages with the next engageable portion 21 to thereby stop the forward movement of the chain guide 11. When the wire 13a is slackened in a condition as shown in FIG. 4, the retainer 30 is subjected to the force of tension spring 41 and swings clockwise to disengage from the engageable portion 21, thus being in condition as shown in FIG. 15. In this condition, the energy conserved in the return spring 12 allows the chain guide 11 to return in rapid traverse, whereby the retainer 30 engages with the adjacent engageable portion 21 to bring the chain guide 11 to a halt.

Figure 16:
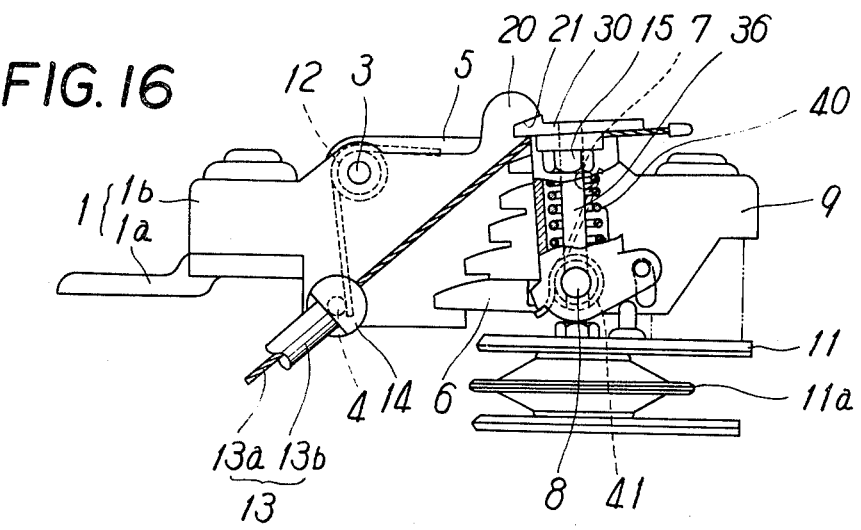
Figure 17:
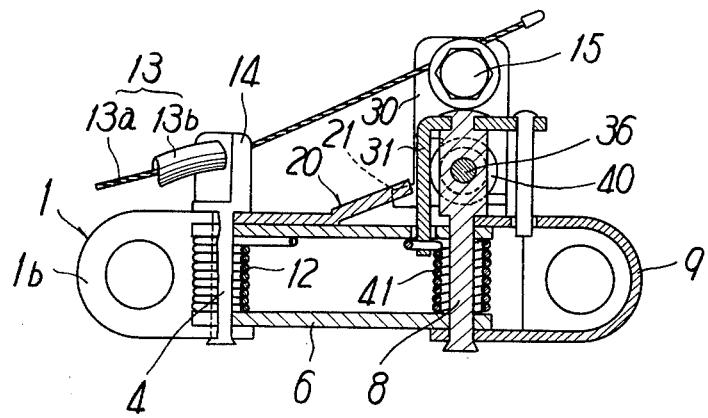
Figure 18:
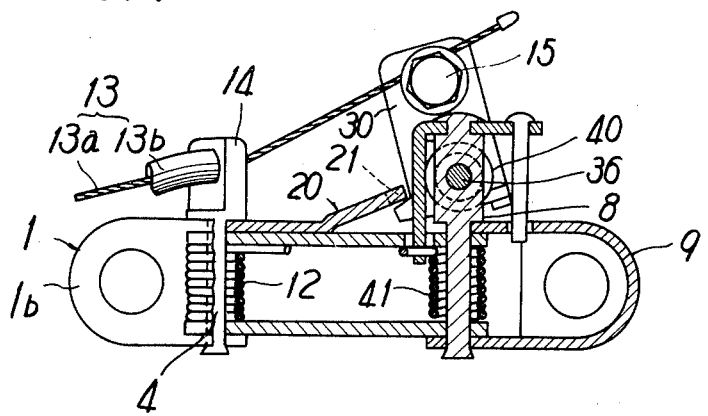
Figure 19:
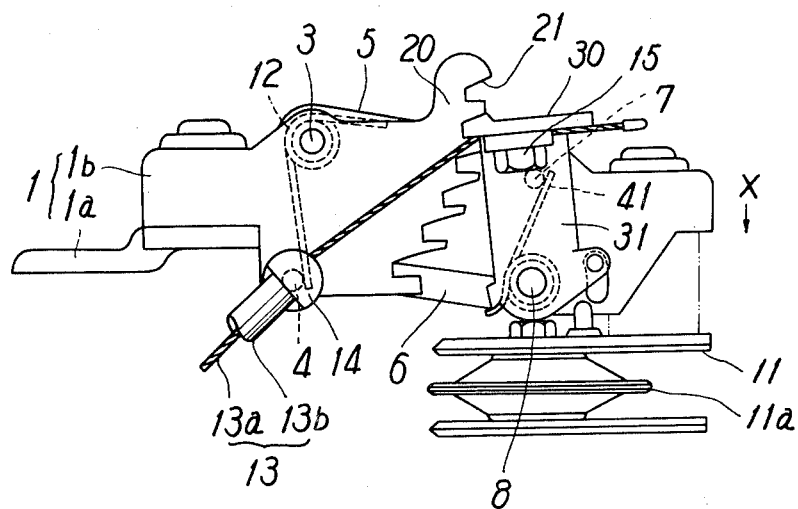
Figure 20:
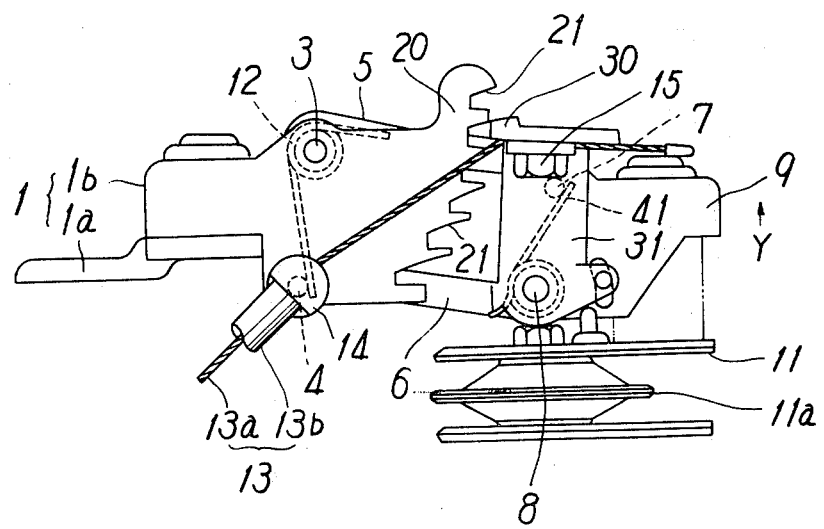

The derailleur of the invention may also have the modified construction shown in FIGS. 16 through 20. Here the pin 8 extends axially to swingably support the support arm 31 at the extension, a support pin 36 is mounted on the pin 8 perpendicularly thereto and supports the retainer 30 swingably. An energy conservation spring 40 is wound onto the pin 36 and retained at a first working end to the retainer 30 and at a second working end to the support arm 31. The tension spring 41 is wound onto the pin 8 and retained at one end to the support arm 31 and at the other end to the pin 7. The energy conservation spring 40 and tension spring 41 are independent of each other and have different working directions so that the energy conservation spring 40 does not act in the working direction of the tension spring 41. In a condition as shown in FIGS. 16 and 17, when the wire 13a is pulled, the retainer 30 swings counterclockwise in FIG. 17 around the support pin 36, whereby the energy of the control force of wire 13a is conserved in the energy conservation spring 40. The retainer 30 then disengages from the engageable portion 21 as shown in FIG. 18. At this time, a distance between a support 14 and a fixture 15 is reduced in accordance with the stroke of the pulling wire 13a, whereby the energy conserved in the energy conservation spring 40 acts to move the chain guide 11 rapidly against the return spring 12 and in the direction of forward movement as shown by the direction of arrow X in FIG. 19. Also, the retainer 30, as shown in FIG. 19, engages with the next engageable portion 21 to stop forward movement of the chain guide 11. In FIG. 19, when the wire 13a is slackened, the tension spring 41 acts on the retainer 30 to swing together with the support arm 31 clockwise around the pin 8, whereby the retainer 30 disengages from the engageable portion 21, thus being in a condition as shown in FIG. 20. From this condition, the chain guide 11 is rapidly returned in the direction of Y in FIG. 20. The restoration of chain guide 11 allows the retainer 30 to engage with the engageable portion 21 and retain the chain guide 11 stationary.

As clearly understood from the above description, the derailleur of the invention is so constructed that a control element having a plurality of engageable portions is combined with a retainer engaging with the engageable portions at the control element to thereby stop the reciprocation of the chain guide, the retainer being actuated by operation of the cable. The retainer is kept in engagement with the engageable portions to stop reciprocation of the chain guide when the control cable is operated with a stroke less than a prescribed extent, and disengages from the engageable portions when the stroke exceeds the prescribed extent to thereby allow the energy conservation spring or return spring to rapidly reciprocate the chain guide. Hence, the chain guide can be set accurately in a proper position with respect to each sprocket and be reliably retained in position, and also noise generated by the chain contacting with the sprocket during reciprocation of the chain guide, can be eliminated regardless of a slow operation of the control cable. Furthermore, the chain and sprocket are subject to less wear during a bicycle speed change operation.

Furthermore, the control wire, even of a pull type having an inner wire and outer sheath, can accurately position the chain guide in accordance with a desired speed change stage and maintain it in position, whereby the derailleur is inexpensive to produce.

While embodiments of the invention have been shown and described, the invention is not limited to the specific constructions thereof, which are merely exemplary. Since many modifications can be made to the exemplary embodiments without departing from the spirit and scope of the invention, the invention is limited solely by the following claims.

What is claimed is:

1. In a derailleur for a bicycle comprising four members, a fixing member, two linkage members pivoted to said fixing member, and a movable member mounting a chain guide and pivoted to said linkage members, and a return spring carried between two of said four members, so that the cooperative operation of a control cable and the action of said return spring enables said movable member to reciprocate with respect to said fixing member for changing the bicycle speed, the improvement comprising:

a control element for setting said movable member in one of a plurality of predetermined positions corresponding to speed change stages, said control element being supported to one of said four members and having a plurality of engageable portions corresponding to each speed change stage defined by reciprocation of said movable member, said engageable portions having engaging faces for each speed change stage and connecting faces for interconnecting said engaging faces;

a retainer engageable with one of said engaging faces at said engageable portions of said control element for retaining said movable member in a proper position corresponding to a desired speed change stage, said retainer being supported swingably to another member of said four members which is relatively movable with respect to said one member carrying said control element, said retainer supporting one end of said control cable, said retainer, when said control cable is operated to move said movable member forward with a stroke of said cable less than a given length, being retained in engagement with one of said engageable portions at said control element and, when said cable imparts a stroke over said given length, disengaging from said engageable portions;

a tension spring for continuously biasing said control cable in the direction of stretching said cable, said tension spring having one working end, said working end engaging with said retainer to bias said retainer in the direction of disengaging from each of said engageable portions; and, an energy conservation spring for conserving energy when said control cable is pulled against said return spring to swing said retainer, said energy conservation spring having first and second working ends, said first working end engaging with said retainer, said second working end engaging with one of said four members, so that when said control cable is pulled to swing said retainer to disengage the same from said engageable portions, the energy conserved in said energy conservation spring causes said movable member to move rapidly.

2. A derailleur for a bicycle according to claim 1, wherein said control element is mounted on said fixing member.

3. A derailleur for a bicycle according to claim 2, wherein said retainer is mounted on said movable member.

4. A derailleur for a bicycle according to claim 2, wherein said retainer is mounted on one of said linkage members.

5. A derailleur for a bicycle according to claim 1, wherein said control element is mounted on said movable member.

6. A derailleur for a bicycle according to claim 5, wherein said retainer is mounted on said fixing member.

7. A derailleur for a bicycle according to claim 5, wherein said retainer is mounted on one of said linkage members.

8. A derailleur for a bicycle according to claim 1, wherein said control element is mounted on one of said linkage members.

9. A derailleur for a bicycle according to claim 8, wherein said retainer is mounted on said fixing member.

10. A derailleur for a bicycle according to claim 8, wherein said retainer is mounted on said movable member.

11. A derailleur for a bicycle according to claim 8, wherein said retainer is mounted on the other of said linkage members.

12. A derailleur for a bicycle according to claim 1, wherein a support arm is supported swingbly to one of said four members, said retainer is supported swingably to said support arm, said tension spring is interposed between said support arm and said retainer, and said energy conservation spring engages at the first working end thereof with said retainer and at the second working end with another member relatively movable with respect to said one of four members which supports said support arm.

13. A derailleur for a bicycle according to claim 12, wherein said support arm and retainer are supported by pins extending in parallel to pins for connecting said four members, and said engageable portions provided at said control element are formed as ratchet-like teeth.

14. A derailleur for a bicycle according to claim 1, wherein said control element is formed of a plate member, engageable portions provided at said control element project upwardly with respect to the outer surface of said control element, and engaging faces at the engageable portions are respectively as a circular arm.

15. A derailleur for a bicycle according to claim 1, wherein a support arm is supported to one of a plurality of pins connecting said four members together, said support arm engaging with the working end of said tension spring, said retainer is supported swingably to said support arm through a support pin perpendicularly intersecting said one pin, and said energy conservation spring engages at the first working end thereof with said retainer and at the second working end with said support arm.

16. A derailleur for a bicycle according to claim 1, wherein the spring force of said return spring is represented by $F_1$, that of said energy conservation spring is represented by $F_2$, and that of said tension spring is represented by $F_3$, and said spring forces satisfy the relationship $F_2 > F_1 > F_3$.

* * * * *